United States Patent

[11] 3,542,370

[72] Inventor Friedrich Laa
Vienna, Austria
[21] Appl. No. 679,879
[22] Filed Nov. 1, 1967
[45] Patented Nov. 24, 1970
[73] Assignee U.S. Philips Corporation
New York, New York
a corporation of Delaware. by mesne assignment
[32] Priority Nov. 3, 1966
[33] Austria
[31] No. A10188/66

[54] LOADING MECHANISM FOR TAPE CARTRIDGE PLAYER
4 Claims, 4 Drawing Figs.

[52] U.S. Cl. .......... 274/4
[51] Int. Cl. .......... G11b 15/24, G11b 23/04
[50] Field of Search .......... 242/55.13, 197—200; 179/100.2Z; 274/4; 214/Parallel links

[56] References Cited

UNITED STATES PATENTS

| | | | |
|---|---|---|---|
| 2,969,929 | 1/1961 | Rudzitis | 242/55.13 |
| 3,146,316 | 8/1964 | Knoth | 179/100.2 |
| 3,167,267 | 1/1965 | Crane | 274/4 |
| 3,385,534 | 5/1968 | Staar | 274/4 |
| 3,395,871 | 8/1968 | Ackermann et al. | 274/4 |

*Primary Examiner*—Bernard Konick
*Assistant Examiner*—Robert S. Tupper
*Attorney*—Frank R. Trifari

ABSTRACT: A loading holder for containing a tape magazine used in a tape transducing apparatus. The sheathlike holder is attached to the apparatus by a mechanical linkage so as to permit its movement to one of two positions located in parallel planes. The tape magazine is inserted in the holder when in one of said positions and will be engaged by the tape driving spindles when the holder is then lowered to the second of said positions.

INVENTOR.
FRIEDRICH LAA
BY
AGENT

LOADING MECHANISM FOR TAPE CARTRIDGE PLAYER

This invention relates to a recording and/or playback apparatus for a tape-shaped record carrier more particularly to the loading mechanisms for accommodating a magazine which is inserted into a loading holder. The loading holder is a sheathlike member arranged on the apparatus. The magazine is slid into the holder while in a first position and by lowering the holder to a second position, the magazine is operatively placed in position relative to tape driving and tape scanning elements arranged on the apparatus. It is an important requirement that the magazine be precisely lowered by means of the loading holder to a position parallel to the initial position so that the magazine can be correctly located relative to the tape driving and tape scanning elements. If the magazine is not properly aligned, the winding spindles or a driving shaft for example, may enter the apertures provided for that purpose in the magazine and the whole arrangement will become jammed. Also the magnetic head and pressure roller, may, on being moved towards the lowered magazine, be located in a wrong position with respect to said magazine, as a result of which the record carrier may be damaged or not be in operative position relative to said elements. To meet the above requirements curved track controls or complicated lever systems have been used generally for guiding purposes when the loading holder is lowered. However, such constructions are very costly and require considerable space which may be a disadvantage in small apparatus, such as for use in motor cars.

The invention overcomes this disadvantage by using a parallel guiding system in lowering the loading holder, having two levers which are pivotally connected to one of the sides of the loading holder and at least one lever which is pivotally connected to the opposite side of the holder. The levers have equal lengths, extend parallel to said sides, and are pivotally secured to the apparatus. At least two of the levers arranged on one side of the sheathlike member are pivotally secured together by means of a rod. A locking device is provided for retaining the holder in the lowered position and for resetting the holder from the lowered position to its first position.

In this manner a simple and space-saving and reliable arrangement for lowering a loading holder is achieved which ensures that the magazine will precisely assume its predetermined lowered position and will also be guided back again to its initial position.

The construction according to the invention also makes it possible to use lever systems in which the journaling of the levers to the loading holder and to the apparatus lie substantially in one plane so that a space-saving feature is obtainable in that the displacement of such apparatus when lowered, will be small. It has proved of particular advantage to provide the levers with bearings arranged in the plane of symmetry between the two positions of the holder. A stable arrangement is obtained if the pivots for the bearings of two levers arranged on opposite sides of the sheathlike member of the holder are in alignment and if the two levers are combined to form a U-brace embracing the holder.

It has proved particularly advantageous to have one of the bearings adjustable in the direction of its height. The loading holder, can thus be adjusted to compensate for manufacturing tolerances.

Since the described loading holder provides a parallel guide in lowering the holder, it is possible to further simplify the apparatus by utilizing the sheathlike member projecting from the apparatus for a grip to lower the holder manually. In the conventional constructions this was not possible since the force for lowering the holder had to be applied to particular places on the apparatus to obtain a really parallel lowering of the holder; therefore separate operating members were required for this purpose.

A locking device is also provided for retaining the holder in its lowered position and can be released manually by a separate operating member or by an electromagnet switch.

In order that the invention may readily be carried into effect, a few examples thereof will now be described in greater detail, by way of example, with reference to the accompanying drawing, in which FIG. 1 shows a first embodiment in which four levers are provided and with reference to which the principle will be explained;

Figure 1:
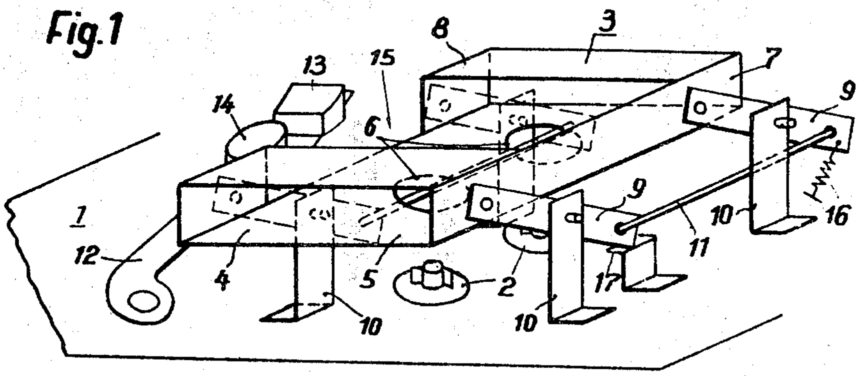

Referring now to FIG. 1, reference numeral 1 denotes a chassis of an apparatus on which winding spindles 2 are rotatably journalled. A loading holder 3, comprising a sheathlike member which is shown in the raised position in which a magazine can be inserted with one of the sides of the magazine introduced into the aperture 4 of the holder. The bottom surface 5 of the sheathlike member has apertures 6, through which winding cores cooperating with the winding spindles and being located in the magazine are accessible in the inserted position of a magazine in the holder.

In order to position the magazine onto said winding spindles the holder 3 can be lowered onto the chassis. For this purpose two levers 9 are pivotally connected to each of the opposite sides 7 and 8 of the holder. The levers extending parallel to the sides and are pivotally journalled in lugs 10 formed on the chassis. The length of the arms of each said levers 9 are equal. In addition the two levers arranged are pivotally connected together through a rod 11. In this manner a guide for the holder is formed which in itself is absolutely stable and ensures that the magazine holder on being lowered is always moved parallel to itself.

When the holder has reached its lowered position, after the lever system is moved by means of an operating member, it can be held there by means of a locking device not shown in this FIG. The tape scanning and pressure elements cooperating with the record carrier are arranged on a support 12 pivotally secured to the chassis, so that the magnetic head 13 and the pressure roller 14 can be swung towards the holder and enter the magazine space through the aperture 15 in the side 8 of the holder.

For resetting the loading holder to its initial position, the locking device is released after which one or more resetting springs 16 raise the holder again, a stop 17 limiting said movement.

Figure 2:
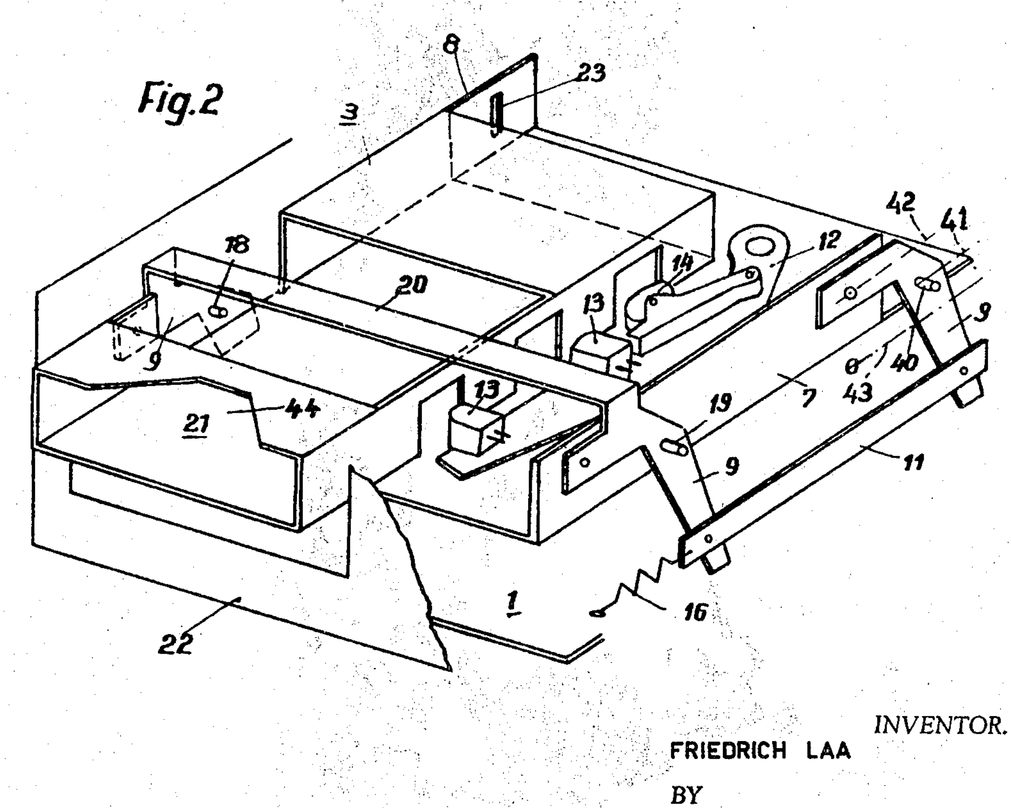
FIG. 2 shows a second embodiment with three levers.

FIG. 2 shows an arrangement in which the loading holder 3 having a support 12 for the tape scanning and pressure elements 13 and 14 and a sheathlike member 21 for containing the magazine. In this embodiment two levers 9 are pivotally secured to the side 7 of the holder and only one lever 9 is pivotally secured to the side 8. The journalling of these levers to the apparatus is not shown in this embodiment, but the pivot 18 of the lever on the side 8 is in alignment with the pivot 19 of the lever on the side 7, both levers being united to a U-brace 20, which embraces the holder. Furthermore the levers on the side 7 are pivotally secured together by means of the rod 11 on which is activated by the resetting spring.

The above mentioned parallel guide is so stable that the holder itself may serve as a grip during lowering and the sheathlike member 21 which contains the magazine can project from the housing 22 of the apparatus to facilitate gripping. The recess 44 in said part 21 provides access for sliding far enough into the sheathlike member. In this manner the loading holder can be lowered by a simple manual pressure on the member 21. For retaining the holder in the down position serves a locking device which cooperates with the slot 23 provided in the side of the holder 8.

Figure 3:
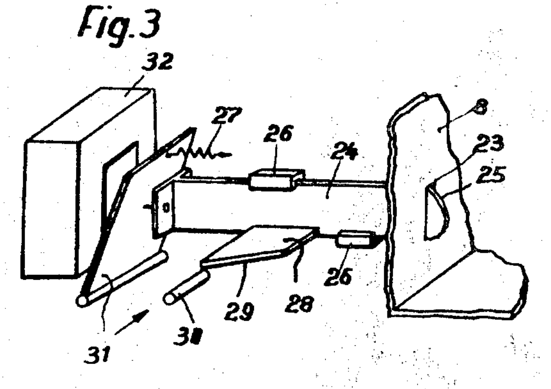
FIG. 3 shows a locking device for retaining a loading holder in its lowered position.

FIG. 3 shows the above-mentioned locking device in detail, namely in the locked position of the holder. A locking member 24 which has an abutting surface 25 which is shifted out of the path of the holder when the holder is lowered in the guide 26 until it enters the slot 23 under the action of the spring 27. For releasing the locking device, the locking member 24 a lug 28 bent at right angles and comprising an abutting surface 29 with which an adjusting member 30 of an operating member cooperates. By means of this operating member, the locking member can be retracted from the slot 23 after which the spring 16 ensures the readjustment of the holder. An armature 31 of an electromagnet 32 is further connected to the locking member 24 so that the locking member may also be retracted from the slot 23 electromagnetically. This electromagnet is energized in a known manner when the end of the record carrier is reached for example, the tension in the record carrier may serve as the criterion so that when a magazine is played back, the holder automatically returns to its initial position so the magazine can be taken out. Alternatively said device may be constructed so that the electromagnet does not operate as in the above described case according to the working current principle, but according to the quiescent current principle as a result of which the loading holder will always assume its initial position when the current is interrupted so that, when the current supply is restored, possible misoperation of the apparatus is avoided.

In the embodiment shown in FIG. 2, the bearings 40, 19, 18 of the levers are provided on the apparatus in the same plane 41 located between the raised and lowered positions, the first position being at 42 and in the second position being at 43. These two positions of the holder are located accurately vertically above and below each other and the holder need only perform a small translation movement. In this manner a stable setting of the magazine positioned on the apparatus can be achieved.

Figure 4:
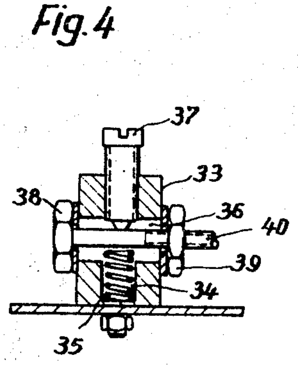
FIG. 4 shows an adjustable bearing for the levers shown in FIG. 1 or 2.

FIG. 4 shows a bearing for the levers 9 which can be adjusted in the direction of its height. For this purpose a bearing block 33 is provided on the chassis which comprises a blind hole 34 in which a spring 35 is provided. The bearing block further comprises a bore 36 with elongated cross section through which the pivot such as 40 of one of the levers is passed so that it engages the spring 35. By means of a screw 37, which can be tightened in the blind hole, the height of the pivot can be adjusted. The desired position may then be fixed by means of the nuts 38, 39.

Such a bearing may be provided in the embodiment shown in FIG. 2 preferably at the lever with the pivot 40. If, in fact, said pivot is moved in the direction of its height, the loading holder pivots about the pivots 18 and 19. The holder can thus simply be arranged parallel to the chassis which is of particular importance for lowering the holder as described.

I claim:

1. A tape magazine loading holder for use in a tape transducing apparatus having tape driving means and a magnetic head, said holder comprising a sheath member for accommodating the tape magazine, mechanical linkage means for supporting the sheath member in a first plane above the tape driving means to permit loading of the magazine, said linkage means including at least three equal length levers pivotally mounted to the tape apparatus, each of said levers being directly connected to the sheath for simultaneous rotational movement in response to a force exerted on the sheath and a resultant displacement of the sheath and tape magazine therein to a second plane parallel to the first plane in which the tape driving means engages the tape magazine, releasable locking means for retaining the sheath member in the second plane and biasing means for returning the sheath member to the first plane when released by the locking means.

2. A tape magazine loading holder as claimed in claim 1 further comprising adjusting means for positioning at least one of the pivotal lever mountings to a plane which is parallel to the first and second planes, said adjusting means including a bearing block affixed to the apparatus and having a spring biased screw for determining the location of the pivot.

3. A tape magazine loading holder as claimed in claim 2, wherein the locking means comprises a locking member mounted on the apparatus and resiliently urged toward the sheath member, said locking member being adapted to lockingly enter a slot in the sheath member when the tape magazine is in the position for engaging the tape driving means, and release means for removing the locking member from the slot.

4. A tape magazine loading holder as claimed in claim 3 wherein two levers are operatively connected to one side of the sheath, and interconnected to each other by a rod member, and a third lever is operatively connected to the opposite side of the sheath and is interconnected to one of the two first mentioned levers by a brace member thus providing for the simultaneous movement and equal displacement of the three levers.

PO-1050
(5/69)

UNITED STATES PATENT OFFICE
CERTIFICATE OF CORRECTION

Patent No. 3,542,370 Dated November 24, 1970

Inventor(s) FRIEDRICH LAA

It is certified that error appears in the above-identified patent and that said Letters Patent are hereby corrected as shown below:

Col. 1, line 18, after "may" insert --not--;

Col. 2, line 65, after "sliding" insert --the magazine--;

Col. 3, line 11, after "reached" insert --,--.

Signed and sealed this 29th day of August 1972.

(SEAL)
Attest:

EDWARD M.FLETCHER,JR.
Attesting Officer

ROBERT GOTTSCHALK
Commissioner of Patent